United States Patent [19]

Kitamori

[11] Patent Number: 4,775,812
[45] Date of Patent: Oct. 4, 1988

[54] THREE SECTION BRUSHLESS MOTOR

[75] Inventor: Teruaki Kitamori, Hirakata, Japan

[73] Assignee: Matsushita Electric Industrial Co., Ltd., Osaka, Japan

[21] Appl. No.: 48,830

[22] Filed: May 12, 1987

[30] Foreign Application Priority Data

May 13, 1986 [JP] Japan .............................. 61-109104

[51] Int. Cl.$^4$ ........................................... H02K 16/00
[52] U.S. Cl. ..................................... 340/112; 310/156
[58] Field of Search ................. 310/67 R, 68 R, 112, 310/114, 154, 156

[56] References Cited

U.S. PATENT DOCUMENTS 4,009,406  2/1977  Inariba ................................ 310/156
4,620,139 10/1986  Egami et al. ..................... 310/68 R
4,639,648  1/1987  Sakamoto ......................... 310/68 R

OTHER PUBLICATIONS

2-Phase Transistor Motor by Teruaki Kitamori, Shin Tanaka and Yoshio Yamada, from National Technical Report, vol. 26, No. 5, (Oct. 1980), pp. 794 to 800 (Japanese with English translation).

Primary Examiner—Patrick R. Salce
Assistant Examiner—D. L. Rebsch
Attorney, Agent, or Firm—Birch, Stewart, Kolasch & Birch

[57] ABSTRACT

A brushless motor includes a first motor section provided with a switching element to change over energization of an exciting coil wound around a stator pole based on a signal from a rotor position detector for detecting rotational position of a rotor magnet. A second motor section has a rotor magnet and a stator pole including the same number of magnet poles as the first motor section with the stator pole being normally maintained at predetermined polarities. A third motor section has a rotor magnet and a stator pole with two times the number of magnet poles of the second motor section, with the stator pole being normally maintained at predetermined polarities. The first, second and third motor sections are arranged on the same shaft, with the third motor section being so disposed as to generate torque in a regular direction at the maximum, with respect to a torque transformation point, in the direction of a generated torque of the second motor.

13 Claims, 4 Drawing Sheets

THREE SECTION BRUSHLESS MOTOR

BACKGROUND OF THE INVENTION

The present invention generally relates to an electric motor and more particularly, to a brushless motor to be employed, for example, as a source for driving a fan to cool an electronic appliance or the like.

With the development of electronic appliances, fans to be employed for cooling thereof play an important part in order to maintain such electronic appliances in a highly reliable state. More specifically, it is normally required that such a fan should have a longer life, and a higher dependability than the electronic appliance system applied therewith. Accordingly, an induction type motor has been conventionally employed for this purpose in many cases. However, in recent years, a dc brushless motor has become widely employed in replacing the induction type motor as referred to above, owing to such advantages thereof that it can be formed in a compact size through standardization and high speed operations without being influenced by the power source voltages, frequencies, etc., while the amount of cooling air therefrom may be readily adjusted according to temperatures of the electronic appliances.

Meanwhile, the fan as described above is required to be inexpensive, since it is incorporated into the electronic appliance merely as an additional part. Therefore, in the conventional brushless motors of this this type, it has been an important technical point to construct the motor in a compact form with the smallest number of parts, and the lowest cost as possible.

For such a motor, since a small starting torque is sufficient for dealing with a fan load, a brushless motor of a 2-phase half wave driving system or a single-phase full wave driving system, or that of a 4-phase half wave driving system or a 2-phase full wave driving system which is devised to remove a "dead point" of torque caused by the rotor position during starting has generally been employed. In connection with the above, one example of a brushless motor of the 2-phase half wave driving system is disclosed at pages 794 to 800 of National Technical Report, Vol. 26, No. 5 (October, 1980).

Particularly, simplification of construction of a motor driving circuit is essential to a fan driving motor for reduction of manufacturing cost and achieving a compact size. The simplest construction for the driving system of a brushless motor is that of the single-phase half wave driving system. In this system, however, since there is a zone at which no torque is produced depending on the position of the rotor, it is necessary to start the rotation of the shaft by a mechanical means. Once the motor has started to rotate, it continues under a small load, owed to the rotational inertia of the rotor by overcoming the zone, not by generating torque. The above described motor type is suitable for application to a clock or the like, because the clock deals with a small load, without repeated starting and stopping.

Subsequently, as one example of conventional constructions, a brushless motor of a single-phase half wave driving system will be described with reference to FIG. 7. FIG. 7 shows structures of a driving circuit and a motor portion thereof in an orthogonal cross section, with its axial direction being aligned with the direction perpendicular to the paper surface of the drawing. Although the motor in the drawing is represented by two poles, a similar function is also available in multi-poles.

In FIG. 7, the known brushless motor includes a stator pole 1, an exciting coil 2 wound around the stator pole 1 with one end of the exciting coil 2 being connected to the ⊕ side of a dc power source 7 through a switching element 6 and the other end is connected to the ⊖ side of said dc power source 7, and a rotor 3 of a permanent magnet is fixed on a shaft 4 for rotation in a direction indicated by an arrow. In the drawing, polarities N and S represent the relation between the polarities to be produced by an exciting current that is caused to flow through the exciting coil 2 of the stator pole 1 at a certain instant, and the polarities of the rotor magnet. For a rotor position detector 5, a hall element or magnetic reluctance element is normally employed in many cases. Now, on the assumption that the rotor position detector 5 is to drive a signal responsive to the N polarity of the rotor magnet 3, a moment is represented in the drawing in which, with respect to the rotational direction as shown, a switch ON signal is fed to the switching element 6 so as to pass the current through the exciting coil 2. In the state as shown in FIG. 7, the poles of the stator pole 1 and the rotor magnet 3 confront each other at the same polarities, with no torque being produced. At this moment, on the assumption that time t is equal to zero, when the rotor magnet 3 is rotated in the direction indicated by the arrow with a lapse of time, the torque reaches a maximum valve when the rotational angle is between zero and $(\pi/2)$ before being reduced to zero at $\pi$. Since the rotor position detector 5 is to obtain a signal from the S pole region of the rotor magnet 3 at this time, the switching element 6 is brought into OFF state, and no exciting current will flow. Accordingly, torque is not generated by the rotor magnet 3 between a rotational angle from $\pi$ to $2\pi$. Such a state is shown in a graphical form in FIG. 8, in which $+T$ represents the torque in a regular direction, while $-T$ denotes the torque in the opposite direction.

Although the brushless motor of the single-phase half wave driving system is simple in construction, it has a disadvantage in that there is a rotor position where no torque is produced as described above.

SUMMARY OF THE INVENTION

Accordingly, an essential object of the present invention is to provide an improved brushless motor which has no dead point in torque generation, even if it is based on a single-phase half wave driving system.

Another important object of the present invention is to provide a brushless motor of the type described above which is stable in functioning at high reliability, and can be readily manufactured at low cost.

In accomplishing these and other objects, according to one preferred embodiment of the present invention, a brushless motor of a single-phase half wave driving system is provided. It includes a first motor section provided with a switching element adapted to change over energization of an exciting coil wound around a stator pole based on a signal from a rotor position detector for detecting a rotational position of a rotor magnet. A second motor section having a rotor magnet and a stator pole including the same number of magnet poles as said first motor section, with said stator pole being normally maintained at predetermined polarities. A third motor section having a rotor magnet and a stator pole including two times the number of magnet poles than said second motor section, with said stator pole being normally maintained at predetermined polarities. The first, second and third motor sections are arranged on the same shaft, with the third motor section being so dispersed as to generate torque in a regular direction at the maximum, with respect to a transformation point in a direction of a generated torque of the second motor.

By the arrangement according to the present invention as described above, in the period when the exciting coil of the first motor section is energized so as to produce the torque in the regular direction, the motor is driven by the composite torque of the first, second and third motor sections. While, during the period when the torque of the first motor section in the regular direction is zero, the motor is to be driven by the composite torque of the second and third motor sections, and thus, the dead point of the torque is advantageously eliminated.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
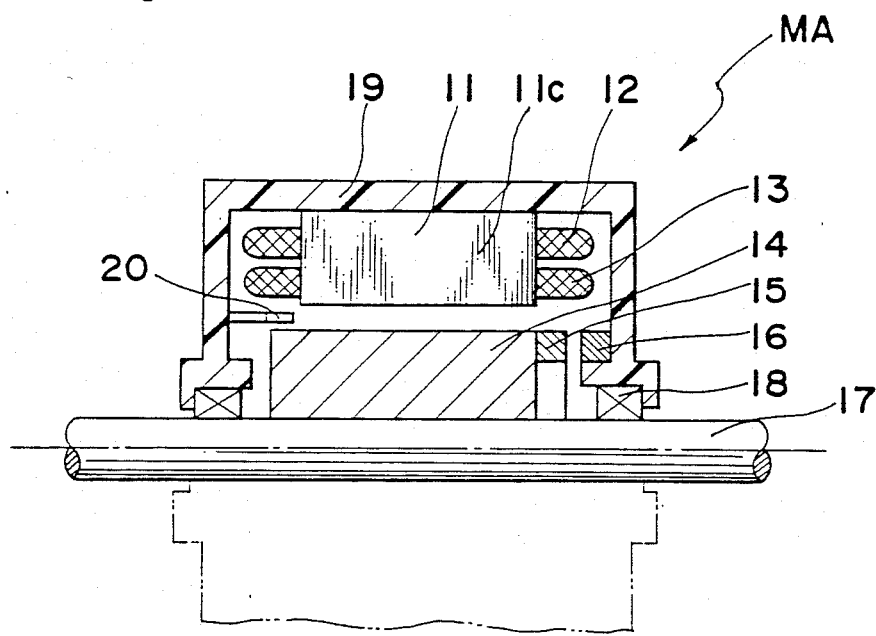
FIG. 1 is a fragmentary cross section of a brushless motor of a cylindrical type according to one preferred embodiment of the present invention.

Before the description of the present invention proceeds, it is to be noted that like parts are designated by like reference numerals throughout the accompanying drawings.

Figure 2:
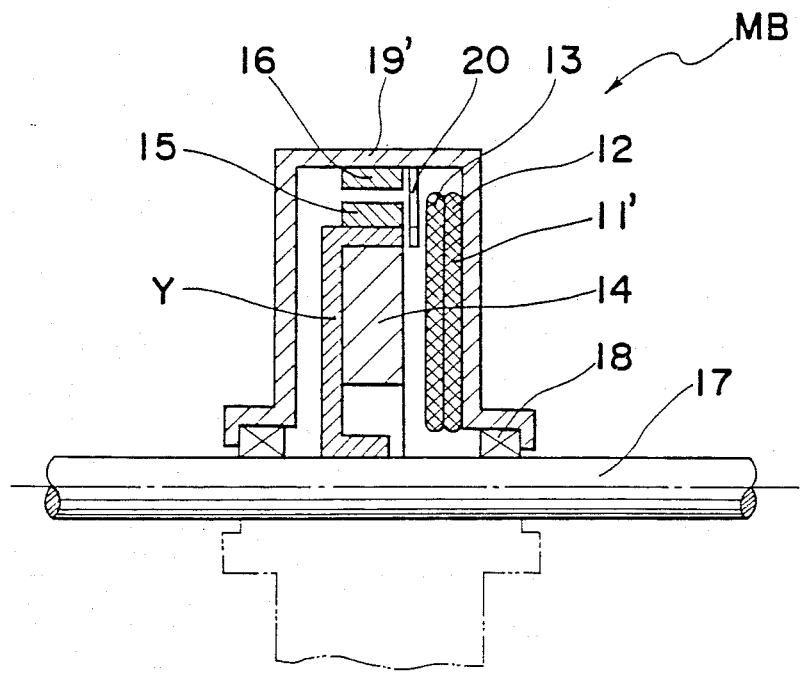
FIG. 2 is a view similar to FIG. 1, which particularly shows a flat type modification.

Referring now to the drawings, there is shown in FIG. 1 a brushless motor MA of a cylindrical type according to one preferred embodiment of the present invention, while FIG. 2 shows a brushless motor MB of a flat type which is a modification of the brushless motor MA of FIG. 1.

In FIG. 1, the brushless motor MA generally includes a shaft 17 rotatably supported by a bracket 19, for example, of a plastic material through bearings 18. A stator pole 11 including a stator core 11c and an exciting coil 12 and a dc exciting coil 13 wound around said stator core 11c. A rotor magnet 14 and an auxiliary rotor magnet 15 integrally fixed to the rotor magnet 14 and mounted on the same shaft 17 as the rotor magnet 14. An auxiliary fixed magnet 16 secured to the bracket 19 and confronting the auxiliary rotor magnet 15 in an axial direction, with a rotor position detector 20 being disposed between the rotor magnet 14 and the exciting coil 13.

In the modified brushless motor MB of FIG. 2, the stator core 11c in the arrangement of FIG. 1 is dispensed with the stator pole 11' and is constituted by the bracket or yoke 19' made of magnetic material such as iron or the like. The exciting coil 12 and dc exciting coil 13 are applied or stuck onto said bracket 19' as shown, while the auxiliary rotor magnet 15 is modified to be fixed to the rotor magnet 14 through a rotor support yoke Y. Since other constructions of the brushless motor MB of FIG. 2 are generally similar to those of the brushless motor MA of FIG. 1, an abbreviated description is included for brevity, with like parts being designated by like reference numerals. It should be noted here that, although the description of functions and effects of the brushless motor according to the present invention is mainly given hereinafter with reference to the brushless motor MA of FIG. 1, such a description may also apply to the modified brushless motor MB of FIG. 2 as well.

In each brushless motor of FIG. 1 and 2, the stator pole 11 has the same number of magnetic poles as the rotor magnet 14, while the auxiliary fixed magnet 16 and the auxiliary rotor magnet 15 have a multiple number of magnetic poles.

Figure 3:
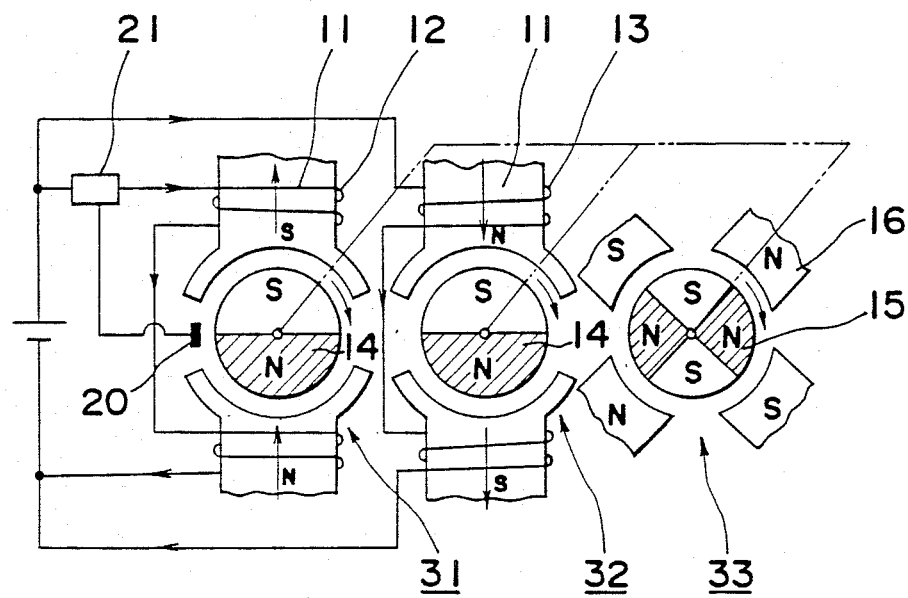
FIG. 3 is an explanatory diagram showing the relative positional relation among the stator pole, exciting coil and rotor magnet in the embodiment of FIG. 1.

In FIG. 3, there is shown a diagram in which essential items in the brushless motor MA or MB are divided into three independent motor sections for explaining the functions thereof.

In other words, the brushless motor according to the present invention may be considered as a combination of three motor sections from its functions. In FIG. 3, respective motor sections as essential items are shown in cross sections taken at right angles with respect to the axial direction, which is perpendicular to the paper surface of the drawing, with like parts in FIG. 1 or FIG. 2 being represented by like reference numerals.

Figure 7:
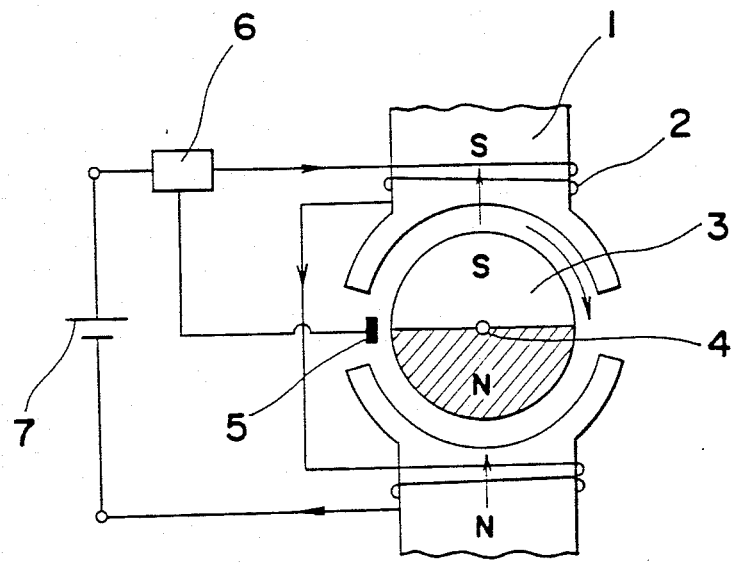
FIG. 7 is a schematic diagram for explaining the construction of a conventional brushless motor of a single-phase half wave driving type (already referred to)

As shown in FIG. 3, the brushless motor of the embodiment may be separated into a first motor section 31, a second motor section 32, and a third motor section 33. The first motor section 31 is of the same construction as the conventional single-phase half wave driving brushless motor described earlier with reference to FIG. 7. While the second motor section 32 is normally excited by the dc exciting coil 13, with the rotor magnet 14 being common to the first motor section 31. The third motor section 33 is constituted by the auxiliary fixed magnet 16 and the auxiliary rotor magnet 15, with the number of poles being in a multiple of the number of poles of the first or second motor section 31 or 32. The third motor section 33 is disposed at such a position, in the relative positions of the magnetic poles, as to generate a maximum regular direction torque, at a transformation point of the regular direction torque (indicated by an arrow in the drawing) or of the opposite direction torque, generated following rotation of the rotor magnet in the second motor section, i.e., at the rotor position which provides a dead point of the torque.

In FIG. 3, the magnetic polarities of the rotor magnet 14 and the stator pole 11 excited by the dc exciting coil 13 shown in the second motor section 32 are forming the dead point of the torque. In this state, the third motor section 33 is arranged to produce the maximum torque in the regular direction (in the direction of the arrow in the drawing). The rotor magnets 14 and 15 shown in the first motor section 31, second motor section 32 and third motor section 33 are fixed on the same shaft 17 at the relative positions as illustrated.

Figure 4:
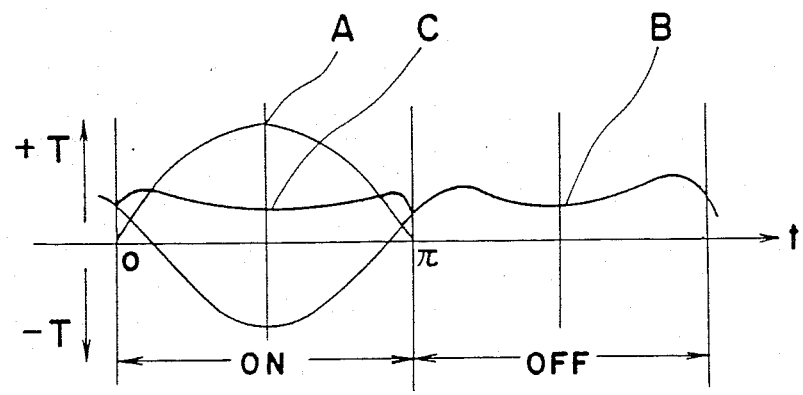
FIG. 4 is a generated torque distribution diagram in the rotating positions of the rotor.

FIG. 4 shows a composite torque of the three motor sections illustrated in FIG. 3.

Figure 8:
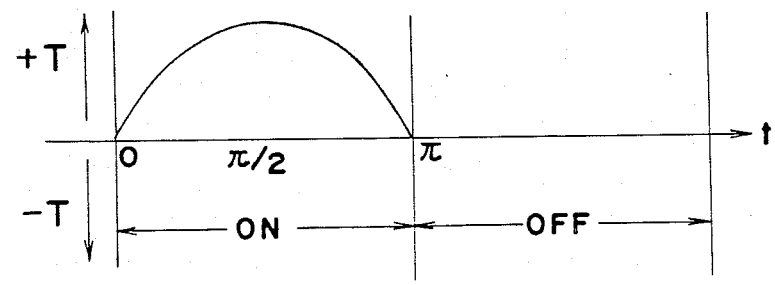
FIG. 8 is a generated torque distribution diagram of the brushless motor of FIG. 7 (already referred to).

More specifically, on the assumption that the moment at which the rotor magnet 14 is positioned at the magnetic pole disposition in FIG. 3 and is represented by the time t=0, when the torque following the rotation of the rotor magnet 14 in the direction of the arrow in FIG. 3 is shown, curve A representing the torque of the first motor section 31 during the ON period of a switching element 21 (FIG. 3) is similar to that of the torque in the conventional brushless motor shown in FIG. 8 referred to earlier.

Torques generated by the second motor section 32 and the third motor section 33 are irrelevant to the ON or OFF of the switching element 21. The composite torques of the second motor section 32 and the third motor section 33 is represented by a curve B. During the ON period of the switching element 21, a composite torque of the first motor section 31, second motor section 32, and third motor section 33 as represented by a curve C is produced. While during the OFF period of the switching element, only the composite torque for the second motor section 32 and third motor section 33 represented by the curve B is generated.

Figure 5:
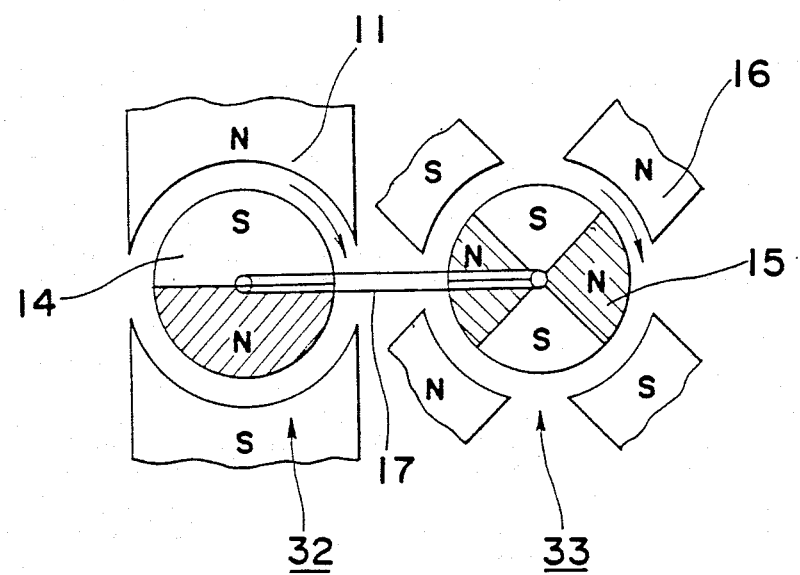
FIG. 5 is an explanatory diagram showing the relative positions of a second motor section and a third motor section with respect to the shaft.

For a better understanding, in FIG. 6 the composite torque F of the second and third motor sections 32 and 33 shown in FIG. 5 will be described in more detail hereinbelow.

Figure 6:
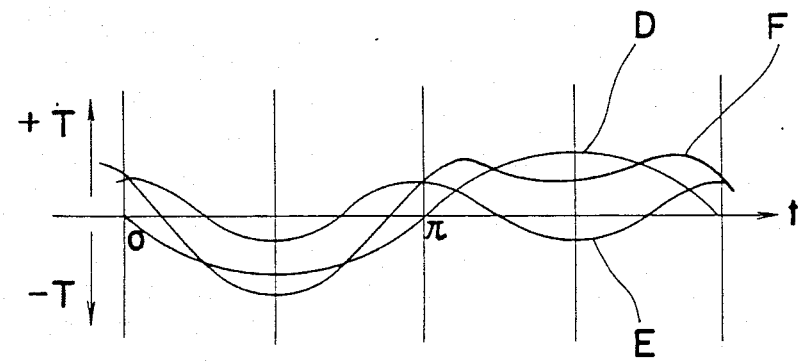
FIG. 6 is a generated torque distribution diagram.

On the assumption that the relative polarity positioning among the stator pole 11, auxiliary fixed magnet 16, rotor magnet 14 and auxiliary rotor magnet 15 is as shown at time t=0, the torques D and E of the respective motors generated following rotation of the rotor magnet in the direction of the arrow and the composite torque thereof may be represented as in the curves in FIG. 6. The composite torque F is the same as the composite torque B of the second and third motor sections in FIG. 4. In FIG. 6, the curve D represents the torque of the second motor 32, while the curve E denotes the torque of the third motor 33.

It should be noted here that the stator pole 11 of the second motor section 32 and the auxiliary fixed magnet 16 of the third motor 33 may be replaced by permanent magnets or adapted to be excited by dc exciting coils. The first motor section 31, second motor section 32 and third motor section 33 as shown in FIG. 3 may be respectively independently provided without being combined into a single motor, with the rotors thereof mounted on the same shaft.

It should also be noted that the stator pole 11 including the stator core 11c, the exciting coil 12 and dc exciting coil 13, as in the cylindrical type brushless motor MA in FIG. 1, may be modified to the slotless construction as in the flat type brushless motor MB in FIG. 2, in which the exciting coil 12 and the dc exciting coil 13 are applied onto the bracket 19' of the magnetic material serving also as a yoke.

It is to be further noted that the brushless motor MA of FIG. 1 may be readily modified into an external rotor type by exchanging the positions of the rotor magnet 14 and the stator pole 11 between the inner side and the outer side.

In the foregoing embodiment, although the stator pole 11 has been explained with reference to the two pole construction, it is clear that the third motor section 33 has 2N poles in the N pole construction.

Moreover, in the construction of the brushless motor according to the present invention, the torque ripple generated becomes small in the relations as described hereinbelow.

The maximum value of torque generated by the first motor section 31 is represented by a, the maximum value of torque produced by the second motor section 32 is denoted by b, and the maximum value of torque generated by the third motor section 33 is represented by c, the distribution of torque produced through rotation of the rotor magnet in the direction of the arrow. The position of the rotor magnet in FIG. 3 set at a time of zero, will become the composition of the torques shown in FIGS. 8 and 6. Therefore, based on the relations that the minimum value of the composite torque between 0 and $\pi$, $a-(b+c)>0$, the minimum value of the composite torque between $\pi$ and $2\pi$, $b-c>0$, the angle $\alpha$ at which the composite torque of the second and third motor sections is 0, the relation in which the composite torque of the second and third motor sections is 0, $b \sin \alpha = C \cos 2\alpha$, and the torque generated by the first motor section at the angle $\alpha$, $a \sin \alpha =$ the maximum value of a composite torque of the first, second and third motor sections, the equations as follows will be established.

$$a-(b+c)=b-c, \therefore a=2b \tag{1}$$

From the relation that
$b \sin \alpha = C \cos 2\alpha = c(\cos^2 \alpha - \sin^2 \alpha)$,
$2 \sin^2 \alpha + (b/c) \sin \alpha - 1 = 0$ $$\therefore \sin\alpha = \frac{-\frac{b}{c} \pm \sqrt{\frac{b^2}{c^2} + 8}}{4} \tag{2}$$

The difference D between the maximum value and the minimum value of the composite torque of the first, second and third motor sections will be represented as $$D = a \sin \alpha - (b-c) = 2b \sin \alpha - (b-c) = b(2 \sin \alpha - 1) + c$$

and the condition where D=0 is $$(c/b) = 1 - 2 \sin \alpha \tag{3}$$

Now, when the maximum value c of the torque generaed by the third motor section is set at 1 as a reference, estimation of the maximum value of the torques generated by the first and second motor sections having less torque fluctuation may be obtained by the equations (1), (2) and (3).

Since the relation is $(c/b) < 1$ (if the relation is $(c/b) > 1$, torque is 0 to minus side between $\pi$ and $2\pi$), the range of the angle $\alpha$ which can be realized may be determined.

If the angle is set at $\alpha = 18°$el, the relation will be $(b/c) = 2.6$ to satisfy the equation (3).

Given in a table below is the relation (b/c):D, as calculated with the electrical angles $\alpha$ set for the composition torque 0 in the second and third motor sections.

| $\alpha$ | b(c = 1) | a | D |
|---|---|---|---|
| 15° el | 3.5 | 7.0 | −0.70 |

-continued

| a | b(c = 1) | a | D |
|---|---|---|---|
| 18° el | 2.6 | 5.2 | 0 |
| 19° el | 2.4 | 4.8 | 0.16 |
| 20° el | 2.2 | 4.4 | 0.30 |
| 25° el | 1.52 | 3.0 | 0.78 |

As is clear from the foregoing description, according to the present invention, it is so arranged that the first motor section constituted by the brushless motor is subjected to single-phase half wave drive, the second motor section having the same number of poles as said first motor section is without any current change-over means, and the third motor section having two times the number of poles than the second motor section, without any current change-over means, are arranged on the same shaft. While the third motor section is so disposed as to produce the maximum regular direction torque with respect to the transformation point of the torque generated by the second motor section, whereby an inexpensive brushless motor of a simple driving system having no dead point of torque can be advantageously realized.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A brushless motor comprising:
   a frame;
   a rotor rotatably mounted in said frame on a shaft;
   a rotor position detector detecting the position of said rotor;
   a first motor section including,
     a first stator section having a predetermined number of stator poles and including a stator exciting coil,
     a first rotor portion of said rotor having a predetermined number of rotor poles, and
     a switching element responsive to said rotor position detector and controlling the polarity of energization of a current supplied said exciting coil;
   a second motor section including,
     a second stator section having the same number of stator poles as said first stator section; and
     a second rotor portion of said rotor having the same number of rotor poles as said first rotor portion,
     the attraction between a said second rotor portion and a said second stator portion switching to a next succeeding said stator portion at a transformation point;
   a third motor section including,
     a third stator section having twice the number of stator poles as each of said first and second stator sections, said stator poles of said third stator section being maintained at predetermined polarities,
     a third rotor portion having twice the number of rotor poles as each of said first and second rotor portions, said rotor poles of said third rotor portion being maintained at predetermined polarities;
   said first, second and third motor sections being arranged on said shaft with the third motor section positioned to generate maximum torque in a desired direction of rotation at the transformation point of said second motor section.

2. A brushless motor comprising:
   a frame;
   a magnetic rotor rotatably mounted in said frame on a shaft;
   a rotor position detector detecting the position of said rotor;
   a first motor section including,
     a first rotor portion of said magnetic rotor having a predetermined number of rotor poles,
     a first stator section confronting said rotor magnet across a predetermined gap having a predetermined number of stator poles equal to the predetermined number of rotor poles and including a stator exciting coil wound around said stator poles, and
     a switching element responsive to said rotor position detector and changing the polarity of energization of a current supplied said stator exciting coil;
   a second motor section including,
     a second stator section having the same number of stator poles as said first stator section and a d.c. exciting coil wound around said stator poles and directly connected to a D.C. power source,
     a second rotor portion of said magnetic rotor having the same number of rotor poles as said first rotor portion,
     the attraction between a said second rotor portion and a said second stator portion switching to a next succeeding said stator portion at a transformation point;
   a third motor section including,
     a third stator section having twice the number of stator poles as said first and second stator sections, said stator poles of said third stator sections being maintained at predetermined polarities,
     a third rotor portion of said magnetic rotor having twice the number of rotor poles as said first and second rotor portions, said rotor poles of said third rotor portion being maintained at predetermined polarities;
   said first, second and third motor sections being arranged on said shaft;
   said third motor section being positioned so as to produce maximum torque in a desired direction of rotation at the transformation point of said second motor section.

3. The motor of claim 1 wherein said stator poles of said third stator section are formed of permanent magnets.

4. A brushless motor as claimed in claim 1, wherein said second stator section includes a dc exciting coil wound around said stator poles of said second motor section.

5. A brushless motor as claimed in claim 1, wherein said rotor and said first, second and third stator sections are arranged to confront face to face in an axial direction.

6. A brushless motor comprising:
   a rotor magnet fixed on a shaft;

a stator pole confronting the rotor magnet through a predetermined gap and provided with the same number of poles as said rotor magnet;

a rotor position detector;

an exciting coil wound around said stator pole and connected to a power source through a switching element to be turned ON or OFF based on a signal of said rotor position detector;

a dc exciting coil wound on said stator pole in a direction opposite to that of said exciting coil and directly connected to the power source;

an auxiliary rotor magnet integrally provided with said rotor magnet and having twice the number of poles of said rotor magnet; and an auxiliary fixed magnet provided to confront said auxiliary rotor magnet and having the same number of poles as that of said auxiliary rotor magnet;

said switching element being arranged to be turned ON or OFF at each electrical angle of 180° el, said auxiliary rotor magnet and said auxiliary fixed magnet being positioned so as to generate maximum torque in a regular direction of rotation at a transformation point at which the attraction of a single rotor pole switches between successive stator poles.

7. A brushless motor as claimed in claim 3, wherein the rotor magnets of said first motor section and said second motor section are formed of a single rotor magnet member, with the stator poles of said first motor section and said second motor section being also formed of a single stator pole member, the exciting coil of said first motor section and the dc exciting coil of said second motor section being respectively wound onto said single stator pole member.

8. A brushless motor as claimed in claim 3, wherein said first, second and third rotor portions of said magnetic rotor are integrally formed together.

9. A brushless motor as claimed in claim 1, wherein the stator section of said third motor section is formed by a fixed magnet.

10. A brushless motor as claimed in claim 1, wherein an electrical angle in which a composite torque of torques generated by said second motor section and third motor section becomes zero is in the range of 15° el to 29° el, with a rotor position where a generated torque is zero in a half-wave exciting section of said first motor section being set as a reference point.

11. A brushless motor as claimed in claim 6, wherein an electrical angle in which a composite torque of torques generated by said rotor magnet and said dc exciting coil, and torques generated by said auxiliary rotor magnet and said auxiliary fixed magnet becomes zero is in the range of 15° el to 29° el, with a rotor position where a generated torque is zero in a half-wave exciting section of said exciting coil to be excited through said switching element being set as a reference point.

12. The motor of claim 1 wherein said stator poles of said second stator section are formed by electromagnets.

13. A brushless motor as claimed in claim 1, wherein an electrical angle in which a composite torque of torques generated by said second motor section and third motor section becomes zero is in the range of 15° el to 29° el, with a rotor position where a generated torque is zero in a half-wave exciting section of said first motor section being set as a reference point.

* * * * *